Oct. 17, 1933.  W. H. ATKINSON  1,930,577

LOUD SPEAKER MOUNTING

Filed Sept. 15, 1931

INVENTOR.

Wm H. Atkinson

Patented Oct. 17, 1933

1,930,577

UNITED STATES PATENT OFFICE 1,930,577

LOUD SPEAKER MOUNTING

William H. Atkinson, San Francisco, Calif., assignor to The Magnavox Company, Chicago, Ill., a corporation of Arizona Application September 15, 1931
Serial No. 562,860

6 Claims. (Cl. 296—1)

My invention relates to radio apparatus for automobiles and the like and more particularly to a novel form of baffle and method of mounting a loud speaker of the electrodynamic type in a small compartment.

An object of my invention is to provide a novel mounting for sound producing apparatus which will cooperate with the walls and the ceiling of the compartment to reduce resonance and improve the acoustic properties of the combination.

Another object of my invention is to provide a novel means for mounting a sound producer of the electrodynamic type in a concealed manner in an automobile body without necessitating a reconstruction of the body proper.

At the present time several manufacturers are making radio sets for installation in automobile bodies in which the loud speaker or sound producer is disposed in the front part of the car beneath the cowl. This disposition of the loud speaker has the serious disadvantage that it does not propagate the sound waves effectively to the rear part of the automobile.

As automobiles are now constructed the space beneath the cowl is practically all that is available for auxiliary apparatus and while it is desirable that the radio controls be located near the dash of the automobile it is equally desirable that the speaker be disposed in such a manner that it will distribute the sound produced thereby uniformly throughout the car body with the best acoustical effects and without interference by the seats. It is also desirable that the speaker be mounted in a more or less concealed position so that it will not detract from the interior appearance of the automobile body. It is therefore a further object of my invention to provide a novel mounting for sound producers which will permit the speaker being disposed in a novel and neat appearing manner without detracting from the interior finish of the car and interfering with the passengers.

In carrying out my invention I propose to provide a baffle which can be disposed at an oblique angle with respect to the walls and ceiling of an automobile body to form a continuation thereof, behind which the speaker may be disposed.

In the preferred embodiment of my invention the baffle may be of substantially triangular shape so that its three sides will meet the side and rear wall and the ceiling of the automobile body.

The novel features which I believe to be characteristic of my invention are pointed out in the appended claims.

The invention itself, however, will best be understood by reference to the drawing wherein I have shown by way of illustration and not of limitation a preferred embodiment thereof.

In the drawing—

Figure 1:
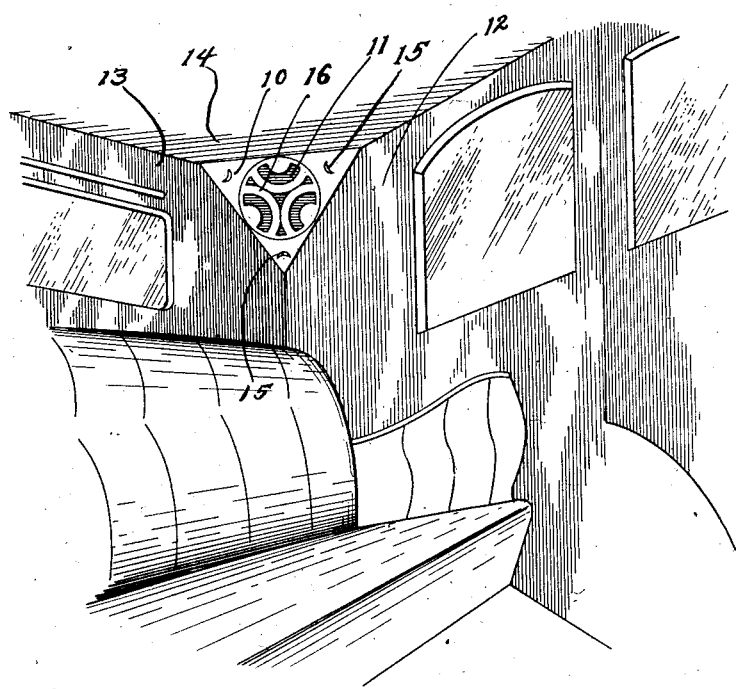
Figure 1 is a fragmentary perspective view showing one form of my invention.

As illustrated in Figure 1, my invention in its simplest form comprises a triangular baffle 10 that is adapted to support a sound producer or loud speaker 11 and be disposed at a substantially oblique angle with each of the interior surfaces of any compartment in which it may be installed.

As here illustrated, the baffle 10 is arranged diagonally across one of the upper interior corners of an automobile body so that its three sides meet and are disposed contiguous with the side 12, rear wall 13 and the ceiling 14 of the compartment. In such an arrangement, with the speaker 11 mounted upon the baffle in accordance with standard practice, the walls 12 and 13 and the ceiling 14 will diverge outwardly from the baffle and produce an effect similar to that of a large horn and as a result the sound producer performance will be far superior to what it would be if it were disposed in any other manner within the compartment.

The baffle 10 is provided with vents 15 for the purpose of preventing compressional waves in the rear of the speaker diaphragm and it may also have a suitable ornamental grille 16 behind which the speaker 11 is disposed.

Figure 2:
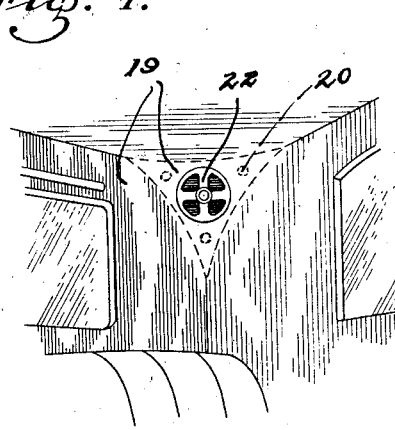
Figure 2 is a view similar to Figure 1 showing a modification of my invention.
Figure 3:
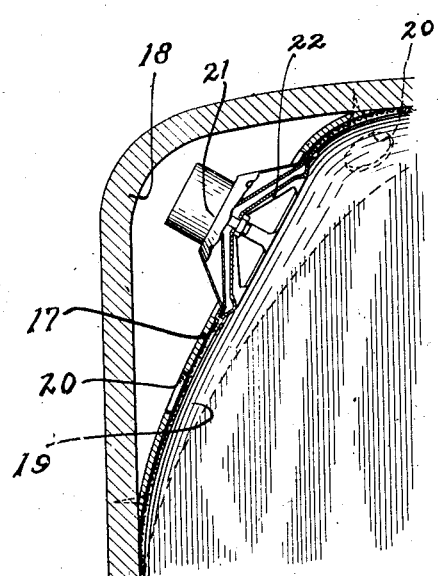
Figure 3 is an enlarged sectional view taken along the vertical center line of Figure 2.

In a modified form of my invention, as illustrated in Figures 2 and 3, I may dish the baffle so that when it is disposed in a corner of a compartment as suggested above all abrupt corners at the meeting edges will be eliminated.

In these latter figures of the drawing the baffle designated by the numeral 17 is shown as secured to the frame work of an automobile body 18 so that an interior lining 19 of the body 18 may be disposed over the baffle to conceal the same. The baffle 17 may be of any suitable material and thickness and will be provided with vents 20 for the purpose above described.

In Figure 3 of the drawing, I show a loud speaker 21 of a recently developed type which is provided with a suitable diaphragm protecting grille 22. Where such a speaker is employed the matter of mounting it upon my improved baffle, as here suggested, is greatly simplified as the rim of the speaker can be secured directly over the edges of the lining 19 around the baffle opening.

With this latter type of speaker the grille work 16, such as is illustrated in Figure 1, may be dispensed with.

As a further advantage of this latter arrangement it should be pointed out that by having the compartment lining fabric 19 extend over the baffle an improvement in the acoustic effects will result.

A theory which is believed to explain the improvement in the acoustic effects obtained by extending the lining fabric over the baffle is that the nap of the fabric forms a villous surface which serves to dampen the movements of the agitated air and compressional waves that are known to travel along the baffle surface immediately adjacent the speaker diaphragm.

From the above it will be seen that my invention provides a novel mounting for loud speakers which will permit the installation of a sound reproducer of the so-called dynamic type in a practical, effective and neat appearing manner and while I have, for the sake of clearness and in order to disclose my invention so that the same can be readily understood, described and illustrated specific devices and arrangements, I desire to have it understood that this invention is not limited to the specific means disclosed but may be embodied in other ways that will suggest themselves, in view of this broad disclosure, to persons skilled in the art. It is believed that this invention is broadly new and it is desired to claim it as such so that all such changes as come within the scope of the appended claims are to be considered as part of this invention.

Having thus described my invention, what I claim and desire to secure by Letters Patent is—

1. In a loud speaker mounting for automobiles, the combination with an automobile body of a substantially triangular baffle disposed obliquely in an upper corner of the body and having a central opening for a loud speaker, a loud speaker mounted behind said baffle with its diaphragm adjacent the opening therein, and a nap fabric lining for the interior of said body disposed over said baffle to form a villous surface which extends from said loud speaker and along the walls and ceiling of the compartment.

2. In a loud speaker mounting for automobiles, the combination with an automobile body of a substantially triangular bowl shaped baffle having a central opening and disposed obliquely in an upper corner of the body with its edges curved outwardly into coincidence with the side walls and ceiling of the body, a fabric lining for the interior of said body extending from said central opening over said baffle and forming a continuous curved nappy surface which merges with the walls and ceiling of the compartment, and a loud speaker mounted in the opening of said baffle.

3. In a loud speaker mounting for automobiles, the combination with an automobile body of a substantially triangular bowl shaped baffle disposed in an upper corner of the body with its edges curved outwardly into coincidence with the side walls and ceiling of the body to form a false corner therefor, a loud speaker mounted upon said baffle, and a nappy fabric lining covering the interior of said body and extending over said baffle to form a villous sound deflecting surface which extends from the speaker over the side wall and ceiling surfaces of the body.

4. In a loud speaker mounting for automobile bodies, the combination with an automobile body of a triangular baffle disposed across an upper corner of the body, said baffle having a central opening to provide a mounting for a loud speaker, a loud speaker mounted behind said baffle with its diaphragm in line with said opening, and a lining material having a villous surface covering the interior of said body and extending over said baffle to soften its sound deflecting properties.

5. In combination with an automobile body, a baffle having an aperture adapted to be disposed across the upper corner of an automobile body to provide a concealing enclosure and support for a sound reproducer, a fabric having a villous surface disposed upon the walls and ceiling of said automobile and extending over said baffle to soften its sound deflecting properties, and a sound reproducer mounted behind said baffle with its diaphragm disposed in the sound aperture of the baffle.

6. The method of mounting an electrodynamic sound reproducer in an automobile body, which comprises disposing a triangular baffle across a corner of the automobile body so that it will lie substantially oblique to all of the surfaces with which it cooperates, providing a sound aperture in said baffle for a sound reproducer, securing the sound reproducer behind said baffle so that its diaphragm will be in line with the sound aperture in the baffle, and finishing the interior of the body with a villous fabric which extends over the baffle to its sound aperture.

WILLIAM H. ATKINSON.